United States Patent
Calaway et al.

(10) Patent No.: US 8,072,703 B1
(45) Date of Patent: Dec. 6, 2011

(54) DISK DRIVE DETECTING WHEN HEAD IS PARKED ON RAMP

(75) Inventors: Charles J. Calaway, Tustin, CA (US); Ashok K. Desai, Westlake Village, CA (US); Kenneth T. Tabacchi, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/821,310

(22) Filed: Jun. 23, 2010

(51) Int. Cl.
*G11B 21/02* (2006.01)
*G11B 5/596* (2006.01)

(52) U.S. Cl. ........ 360/75; 360/78.04

(58) Field of Classification Search .......... None
See application file for complete search history.

(56) References Cited

U.S. PATENT DOCUMENTS

| | | | |
|---|---|---|---|
| 5,485,323 A | 1/1996 | Anderson et al. | |
| 6,512,650 B1 * | 1/2003 | Tanner | 360/75 |
| 6,721,119 B1 | 4/2004 | Hassan et al. | |
| 6,754,027 B2 * | 6/2004 | Hirano et al. | 360/75 |
| 6,771,480 B2 | 8/2004 | Brito | |
| 6,867,944 B1 | 3/2005 | Ryan | |
| 7,046,475 B2 | 5/2006 | Hosokawa | |
| 7,072,135 B2 * | 7/2006 | Suzuki | 360/75 |
| 7,113,361 B2 | 9/2006 | Hassan | |
| 7,203,019 B1 | 4/2007 | Liu et al. | |
| 7,215,504 B1 | 5/2007 | Bennett | |
| 7,295,395 B2 | 11/2007 | Koh et al. | |
| 7,483,233 B2 * | 1/2009 | Kim et al. | 360/75 |
| 7,548,392 B1 * | 6/2009 | Desai et al. | 360/75 |
| 7,636,220 B1 * | 12/2009 | Chui et al. | 360/75 |
| 2008/0002274 A1 | 1/2008 | Allen et al. | |

* cited by examiner

*Primary Examiner* — K. Wong

(57) ABSTRACT

A disk drive is disclosed comprising a disk, a head coupled to a distal end of an actuator arm, a voice coil motor (VCM) operable to rotate the actuator arm about a pivot in order to actuate the head radially over the disk, and a ramp located near an outer edge of the disk for parking the head. A first back electromotive force (BEMF) voltage of the VCM is measured, and a current is applied to the VCM for a first interval in order to move the actuator arm in a first radial direction. After the first interval, a second BEMF voltage of the VCM is measured, and whether the head is parked is detected in response to the first and second BEMF voltages.

22 Claims, 5 Drawing Sheets

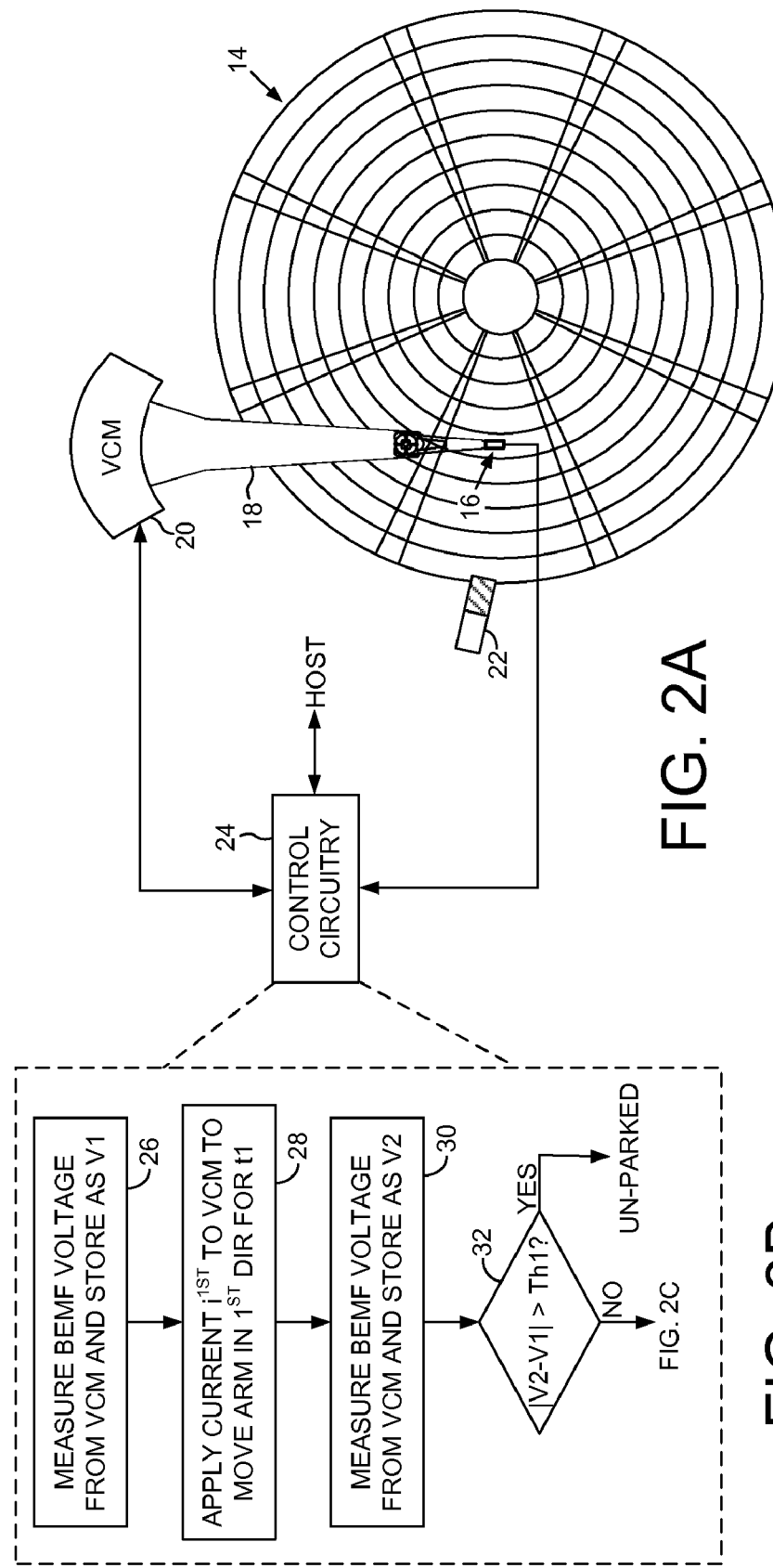

Th2 = 1.5 · Th1

US 8,072,703 B1

DISK DRIVE DETECTING WHEN HEAD IS PARKED ON RAMP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 1 as comprising a number of servo tracks 3 defined by servo sectors $5_0$-$5_N$ recorded around the circumference of each servo track. Each servo sector 5, comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation.

Each servo sector 5, further comprises groups of servo bursts 13, which are recorded with precise intervals and offsets relative to the track centerlines. The servo bursts 13 provide fine head position information used for centerline tracking while accessing a data track during write/read operations.

When the disk drive is idle (not servicing host commands), the head is typically parked on a ramp located near an outer edge of the disk. The control firmware typically maintains the state of the head (parked or un-parked) so that the disk drive knows whether the head should be unloaded from the ramp before executing a new host command. However if the control firmware malfunctions when determining the state of the head, the disk drive may fail when attempting to execute a new host command.

BRIEF DESCRIPTION OF THE DRAWINGS

FIG. 2A shows a disk drive according to an embodiment of the present invention comprising a VCM for rotating an actuator arm about a pivot to actuate a head radially over a disk, and a ramp for parking the head.

FIG. 2B is a flow diagram according to an embodiment of the present invention wherein a difference in a BEMF voltage of the VCM is evaluated to detect whether the head is parked.

DETAILED DESCRIPTION OF EMBODIMENTS OF THE INVENTION

Figure 1:
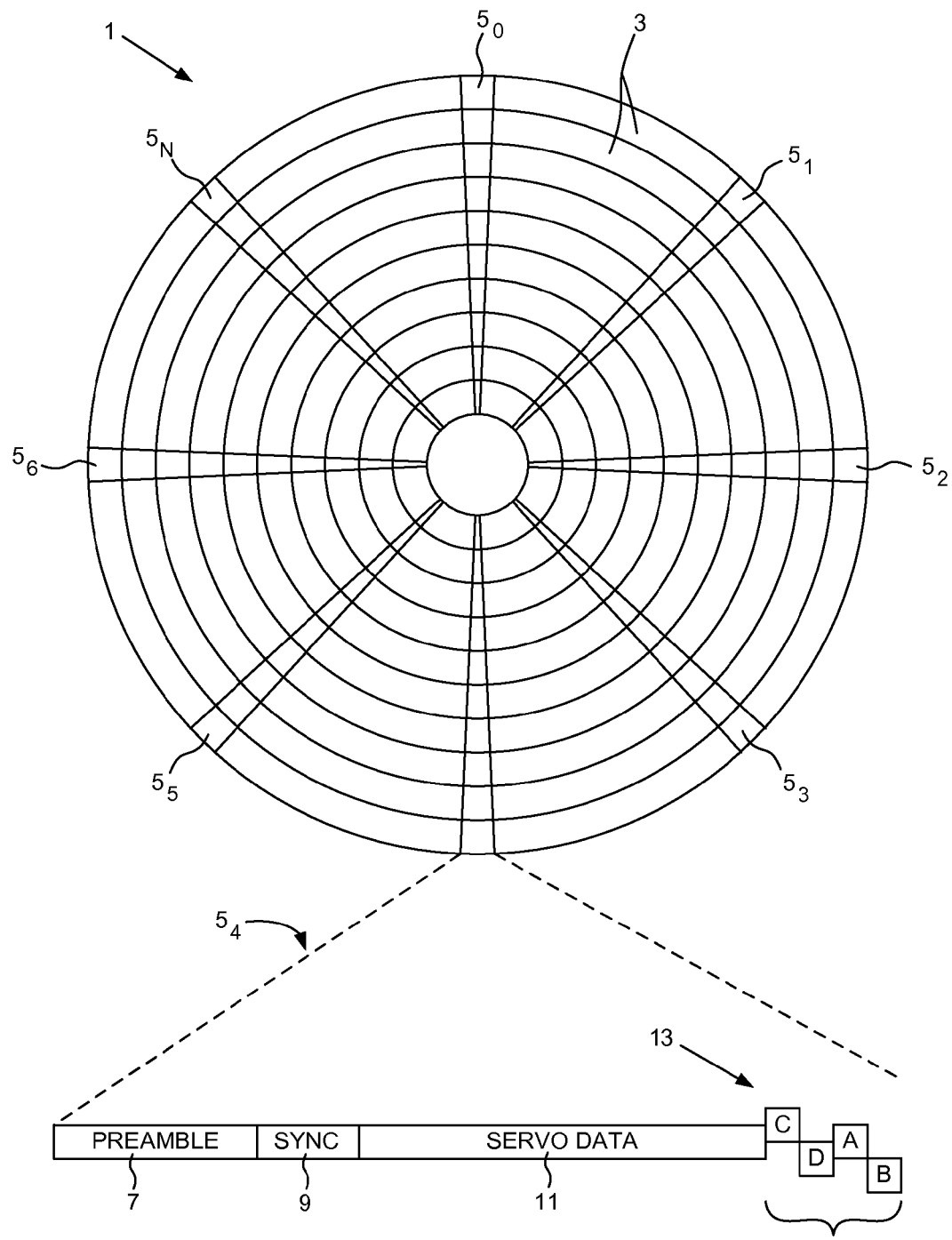
FIG. 1 shows a prior art disk format comprising a plurality of servo tracks defined by servo sectors.

FIG. 2A shows a disk drive according to an embodiment of the present invention comprising a disk 14, a head 16 coupled to a distal end of an actuator arm 18, a voice coil motor (VCM) 20 operable to rotate the actuator arm 18 about a pivot in order to actuate the head 16 radially over the disk 14, and a ramp 22 located near an outer edge of the disk 14 for parking the head 16. The disk drive further comprises control circuitry 24 operable to execute the flow diagram of FIG. 2B wherein a first back electromotive force (BEMF) voltage of the VCM is measured (step 26), and a first current is applied to the VCM for a first interval in order to move the actuator arm in a first radial direction (step 28). After the first interval, a second BEMF voltage of the VCM is measured (step 30), and whether the head is parked is detected in response to the first and second BEMF voltages (step 32).

In one embodiment, the actuator arm 18 comprises a tab (not shown) extending past the head 16 which engages the ramp 22 in order to park the head 16. When the actuator arm 18 is parked on the ramp 22, an outer diameter crash stop (not shown) prevents the actuator arm 18 from moving further in the outer diameter direction, and a latching magnet (not shown) prevents the actuator arm 18 from moving in the inner diameter direction (i.e., retains the actuator arm 18 in the parked position on the ramp 22). In one embodiment, a magnitude of the current applied to the VCM 20 to determine whether the head is parked is small enough to ensure the resulting torque of the VCM 20 does not exceed the latching force of the latching magnet.

In the embodiment of FIG. 2B, the head 16 is determined to be un-parked (free to move over the disk) when the difference between the first and second BEMF voltages exceeds a threshold (step 32). In other words, if the actuator arm 18 is free to move over the disk 14, applying a current to the VCM 20 will result in a change in the BEMF voltage of the VCM 20. Conversely, if the actuator arm 18 is not free to move (i.e., parked on the ramp 22), then applying a current to the VCM 20 will not significantly change the BEMF voltage of the VCM 20. In one embodiment, the BEMF detection threshold (step 32) is selected high enough so that it is very unlikely any movement of the actuator arm while the head is parked will be falsely detected as being in the un-parked state.

Figure 2C:
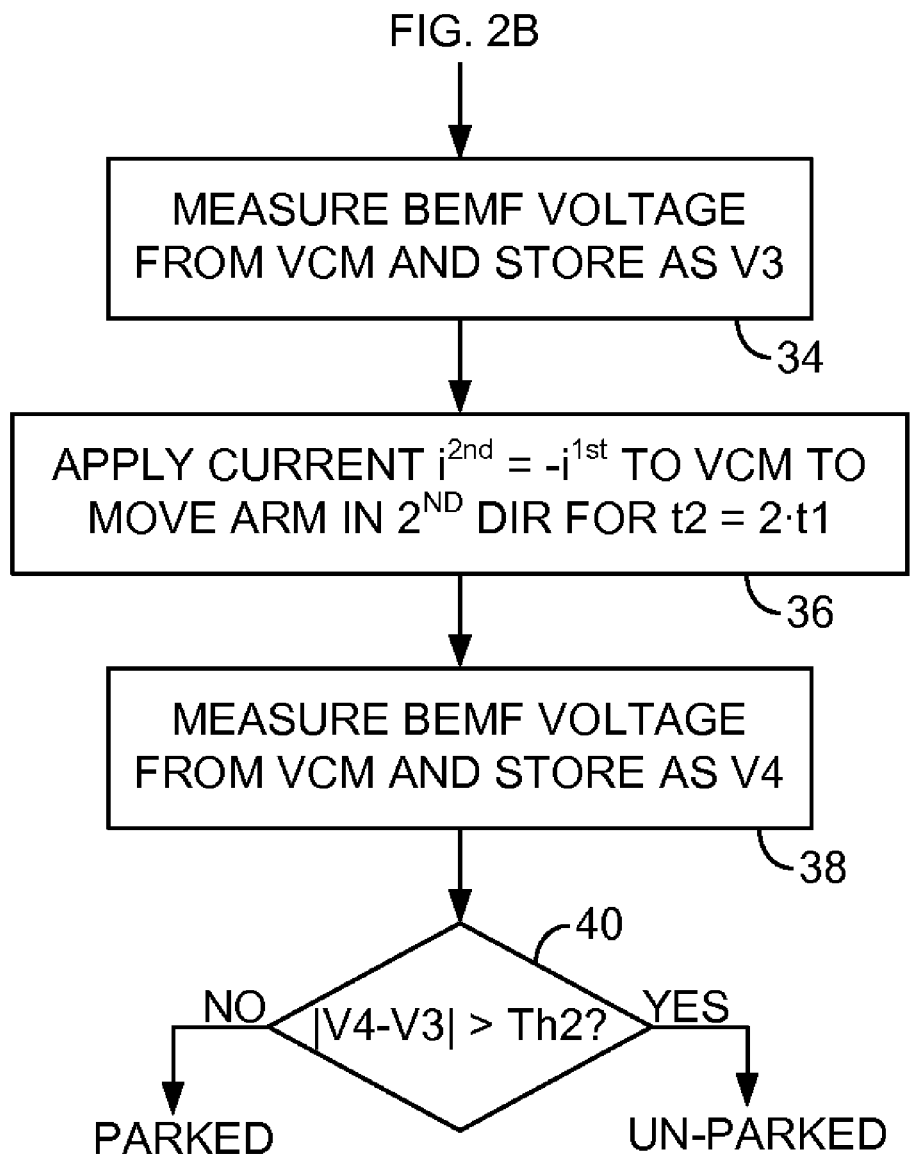
FIG. 2C is a flow diagram according to an embodiment of the present invention wherein the actuator arm is moved in two (opposite) directions to detect whether the head is parked.

In one embodiment, if after applying a first current to the VCM 20 the difference in the BEMF voltage does not exceed a threshold (step 32 of FIG. 2B), it may not mean that the head 16 is parked. For example, if the actuator arm 18 is already pressing against an inner diameter crash stop, applying a current to move the actuator arm toward the inner diameter will not change the BEMF voltage even though the head is not parked. Similarly, if the actuator arm 18 is somewhere on the ramp 22 or pressing against the bottom edge of the ramp 22, applying a current to move the actuator arm toward the outer diameter may not change the BEMF voltage even though the head is not parked. Therefore, in an embodiment shown in the flow diagram of FIG. 2C, if the difference between the BEMF voltage does not exceed the threshold (step 32 of FIG. 2B), a third BEMF voltage is measured (step 34) and a second current is applied to the VCM for a second interval in order to move the actuator arm in a second direction opposite the first direction (step 36). After the second interval, a fourth BEMF voltage is measured (step 38), and whether the head is parked is detected in response to the third and fourth BEMF voltages (step 40). In the embodiment of FIG. 2C, whether the head is parked is determined by comparing a difference between the third and fourth BEMF voltages to a threshold.

In the embodiment of FIG. 2C, the second current is opposite in polarity from the first current and is applied for a second interval equal to twice the first interval. This embodiment may help detect an un-parked state of the head when the actuator arm is pressed against or on the ramp (but not latched). The first interval may not be long enough to move the actuator arm up the ramp with enough velocity to exceed BEMF the detection threshold. Increasing the second interval helps brake any movement of the actuator arm and then allows the actuator arm to gain enough velocity in the opposite direction to exceed the BEMF detection threshold.

Figures 3, 4:
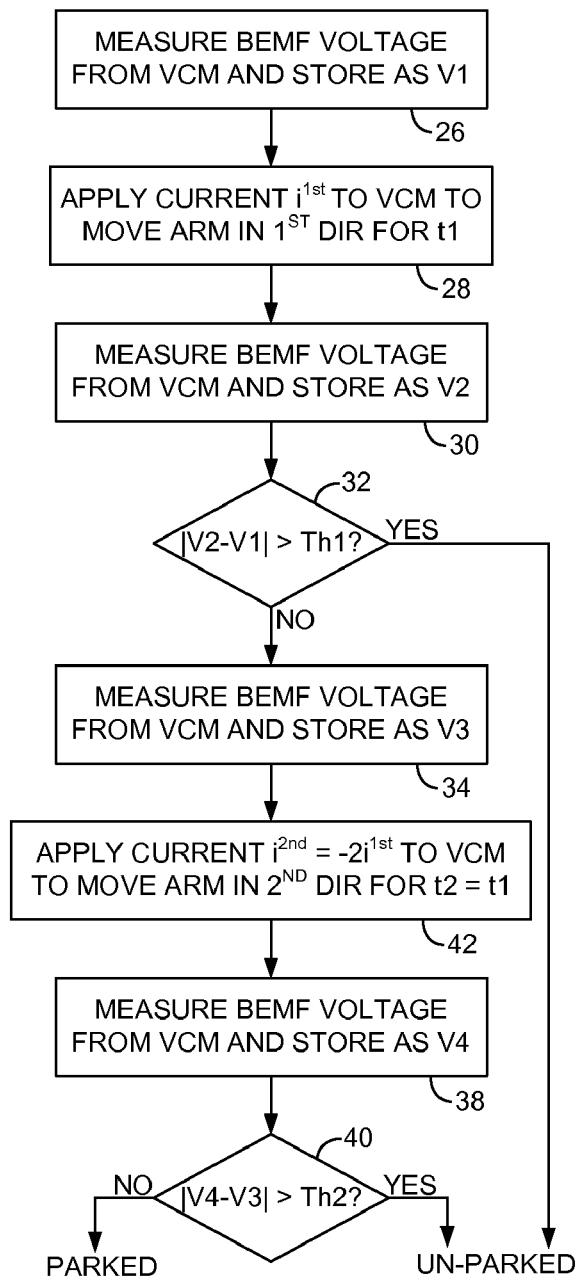
FIG. 3 is a flow diagram according to an embodiment of the present invention wherein the current applied to the VCM is increased when moving the actuator arm in the opposite direction.
FIG. 4 shows an embodiment of the present invention wherein a threshold for evaluating the difference between the BEMF voltages is increased after moving the actuator arm in the opposite direction.

FIG. 3 shows an alternative embodiment of the present invention wherein the second interval equals the first interval, but a magnitude of the second current is twice a magnitude of the first current (step 42). This embodiment has a similar effect as doubling the interval in that it helps brake the actuator arm and then gain enough velocity in the opposite direction to exceed the BEMF detection threshold. Although the magnitude of the second current may be greater than the magnitude of the first current, the magnitude of the second current is selected below a level that ensures the resulting torque of the VCM does not exceed the latching force of the latching magnet when the head is parked.

FIG. 4 shows an embodiment of the present invention wherein the second BEMF detection threshold (step 40) is greater than the first BEMF detection threshold (step 32). For example, the second BEMF detection threshold may be 1.5 times the first BEMF detection threshold. In this embodiment, increasing the BEMF detection threshold after the second interval may help prevent falsely detecting that the head is un-parked.

Figure 5:
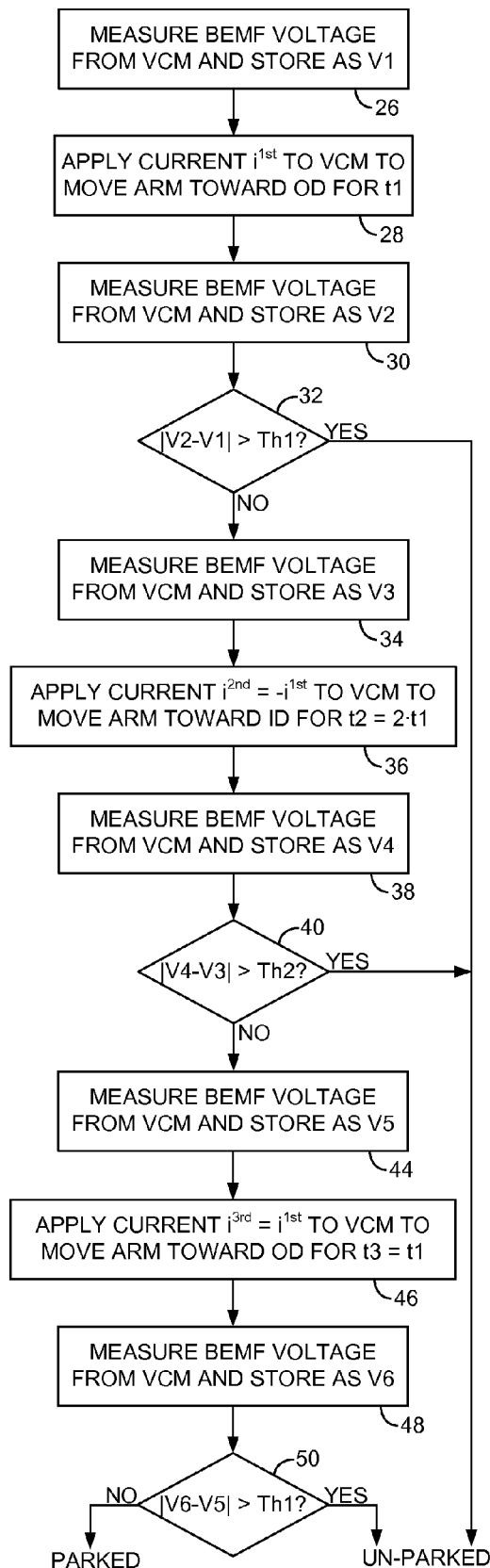
FIG. 5 is a flow diagram according to an embodiment of the present invention wherein the actuator arm is first moved toward an outer diameter of the disk, and then toward an inner diameter of the disk, and optionally back toward the outer diameter of the disk.

FIG. 5 is a flow diagram according to an embodiment of the present invention wherein the actuator arm is first moved toward an outer diameter of the disk during the first interval (step 28) and then moved toward an inner diameter of the disk during the second interval (step 36). This embodiment helps quickly determine whether the head is un-parked after the first interval. That is, if the actuator arm is first moved toward the inner diameter of the disk, and the actuator arm is already pressed against the inner diameter crash stop, the un-parked stated will not be detected until after the second interval. However, if the actuator arm is already pressed against the inner diameter crash stop, the un-parked state will be detected if the actuator arm is moved toward the outer diameter during the first interval.

Also in the embodiment of FIG. 5, if the head is detected as being parked after the second interval (step 40), a fifth BEMF voltage is measured (step 44), and then a third current is applied for a third interval to move the actuator arm toward the outer diameter of the disk (step 46). After the third interval, a sixth BEMF voltage is measured (step 48) and whether the head is parked is detected in response to the fifth and sixth BEMF voltages (step 50). For example, the head is detected as being un-parked if a difference between the fifth and sixth BEMF voltages exceeds the first threshold. Also in the embodiment of FIG. 5, a magnitude of the third current matches the first current, and the third interval equals the first interval. This embodiment helps ensure the actuator arm is moved back to its original position (or close to its original position), that is, the position the actuator arm was in prior to executing the BEMF detection procedure.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
 a disk;
 a head coupled to a distal end of an actuator arm;
 a voice coil motor (VCM) operable to rotate the actuator arm about a pivot in order to actuate the head radially over the disk;
 a ramp located near an outer edge of the disk for parking the head; and
 control circuitry operable to:
  measure a first back electromotive force (BEMF) voltage of the VCM;
  apply a first current to the VCM for a first interval in order to move the actuator arm in a first radial direction;
  after the first interval, measure a second BEMF voltage of the VCM; and
  first detect that the head is un-parked and free to move when a difference between the first and second BEMF voltages exceeds a threshold.

2. The disk drive as recited in claim 1, wherein the first radial direction is toward an outer diameter of the disk.

3. The disk drive as recited in claim 1, wherein when the control circuitry first detects that the head is parked, after the first interval the control circuitry is further operable to:
 measure a third BEMF voltage of the VCM;
 apply a second current to the VCM for a second interval in order to move the actuator arm in a second radial direction opposite the first radial direction;
 after the second interval, measure a fourth BEMF voltage of the VCM; and
 second detect whether the head is un-parked and free to move in response to the third and fourth BEMF voltages.

4. The disk drive as recited in claim 3, wherein the first radial direction is toward an outer diameter of the disk and the second radial direction is toward an inner diameter of the disk.

5. The disk drive as recited in claim 3, wherein the second interval is greater than the first interval.

6. The disk drive as recited in claim 3, wherein a magnitude of the second current is greater than a magnitude of the first current.

7. The disk drive as recited in claim 3, wherein the control circuitry first detects that the head is un-parked and free to move when a first difference between the first and second BEMF voltages exceeds a first threshold, and second detects that the head is un-parked and free to move when a second difference between the third and fourth BEMF voltages exceeds a second threshold.

8. The disk drive as recited in claim 7, wherein the second threshold is greater than the first threshold.

9. The disk drive as recited in claim 3, wherein when the control circuitry second detects that the head is parked, after the second interval the control circuitry is further operable to:
measure a fifth BEMF voltage of the VCM;
apply a third current to the VCM for a third interval in order to move the actuator arm in the first radial direction;
after the third interval, measure a sixth BEMF voltage of the VCM; and
third detect whether the head is un-parked and free to move in response to the fifth and sixth BEMF voltages.

10. The disk drive as recited in claim 9, wherein the third current substantially equals the first current.

11. The disk drive as recited in claim 9, wherein the third interval substantially equals the first interval.

12. A method of operating a disk drive, the disk comprising, a disk, a head coupled to a distal end of an actuator arm, a voice coil motor (VCM) operable to rotate the actuator arm about a pivot in order to actuate the head radially over the disk, and a ramp located near an outer edge of the disk for parking the head, the method comprising:
measuring a first back electromotive force (BEMF) voltage of the VCM;
applying a first current to the VCM for a first interval in order to move the actuator arm in a first radial direction;
after the first interval, measuring a second BEMF voltage of the VCM; and
first detecting that the head is un-parked and free to move when a difference between the first and second BEMF voltages exceeds a threshold.

13. The method as recited in claim 12, wherein the first radial direction is toward an outer diameter of the disk.

14. The method as recited in claim 12, wherein when the first detecting detects that the head is parked, after the first interval further comprising:
measuring a third BEMF voltage of the VCM;
applying a second current to the VCM for a second interval in order to move the actuator arm in a second radial direction opposite the first radial direction;
after the second interval, measuring a fourth BEMF voltage of the VCM; and
second detecting whether the head is un-parked and free to move in response to the third and fourth BEMF voltages.

15. The method as recited in claim 14, wherein the first radial direction is toward an outer diameter of the disk and the second radial direction is toward an inner diameter of the disk.

16. The method as recited in claim 14, wherein the second interval is greater than the first interval.

17. The method as recited in claim 14, wherein a magnitude of the second current is greater than a magnitude of the first current.

18. The method as recited in claim 14, wherein the first detecting detects that the head is un-parked and free to move when a first difference between the first and second BEMF voltages exceeds a first threshold, and the second detecting detects that the head is un-parked and free to move when a second difference between the third and fourth BEMF voltages exceeds a second threshold.

19. The method as recited in claim 18, wherein the second threshold is greater than the first threshold.

20. The method as recited in claim 14, wherein when the second detecting detects that the head is parked, after the second interval further comprising:
measuring a fifth BEMF voltage of the VCM;
applying a third current to the VCM for a third interval in order to move the actuator arm in the first radial direction;
after the third interval, measuring a sixth BEMF voltage of the VCM; and
third detecting whether the head is un-parked and free to move in response to the fifth and sixth BEMF voltages.

21. The method as recited in claim 20, wherein the third current substantially equals the first current.

22. The method as recited in claim 20, wherein the third interval substantially equals the first interval.

* * * * *